3,051,719
PHTHALOCYANINES STABLE TO SEPARATION
Georg Geiger, Binningen, Baselland, and Armando Geiger, Basel, Switzerland, assignors to Sandoz Ltd., Basel, Switzerland
No Drawing. Filed Mar. 8, 1961, Ser. No. 94,166
Claims priority, application Switzerland Mar. 18, 1960
3 Claims. (Cl. 260—314.5)

This invention relates to a process for the production of phthalocyanine pigments which are stable to separation and contain 0 to 1 atom of metal and 13 to 16 atoms of chlorine and/or bromine in the molecule. For this purpose 1 mol of a metal phthalocyanine having 0 to 4 chlorine and/or bromine atoms in the molecule is reacted with 1 to 10 moles of a dialdehyde, a dicarboxylic acid, a saturated monocarboxylic acid or one of their acid derivatives, and the resulting compound (B) is then mixed with a phthalocyanine containing 0 to 1 metal atom and 13 to 16 chlorine and/or bromine atoms in the molecule (A) to render it stable to separation.

The metal-containing phthalocyanines possessing 13 to 16 chlorine and/or bromine atoms in the molecule which have to be rendered stable to separation are generally copper phthalocyanines. Other metal phthalocyanines of this type are e.g. those with the metals iron, zinc, nickel, cobalt and vanadium. Both the metal-containing and the metal-free phthalocyanines of this group (A) contain 13 to 16 chlorine and/or bromine atoms in the molecule, preferably 13 to 16 chlorine atoms or 1 to 6 bromine atoms plus 15 to 9 chlorine atoms.

Suitable metal phthalocyanines containing 0 to 4 chlorine and/or bromine atoms which can be reacted with 1 to 10 moles of a dialdehyde, dicarboxylic acid, saturated monocarboxylic acid or one of their acid derivatives are, in particular, those of the metals copper, cobalt, nickel, zinc, vanadium, iron and magnesium. The most advantageous for the present purpose are unhalogenated or monohalogenated and, in particular, monochlorinated copper, nickel or zinc phthalocyanine, but di-, tri- or tetrachloro-metal or di-, tri- or tetrabromo-metal phthalocyanines, for example, can also be used.

1 mol of these metal phthalocyanines is reacted with 1 to 10 moles of a dialdehyde, a dicarboxylic acid, a saturated monocarboxylic acid or one of their acid derivatives or a mixture of the aforenamed compounds. It is very favorable to react the metal phthalocyanine in concentrated sulfuric acid, if necessary with the addition of up to about 100% by weight of oleum, calculated on the sulfuric acid. The reaction is carried out at an elevated temperature, preferably at about 50° to 150° C., or with special advantage at 80° to 100° C. A very simple procedure is to dissolve the phthalocyanine (A) and the metal phthalocyanine having 0 to 4 halogen atoms in concentrated sulfuric acid, if necessary with the addition of oleum, and to carry out the reaction of the metal phthalocyanine containing 0 to 4 halogen atoms with the dialdehyde or the acid in this solution.

Specially suitable dialdehydes besides glyoxal are e.g. aliphatic saturated dialdehydes, notably those with 4 or more carbon atoms, e.g. succindialdehyde, glutardialdehyde, adipindialdehyde and the higher molecular dialdehydes of this series, especially those having up to about 10 C atoms.

Any of the saturated and unsaturated aliphatic dicarboxylic acids can be employed as dicarboxylic acids, in particular those with 4 or more carbon atoms, e.g. maleic acid, glutaric acid, adipic acid, and the high molecular dicarboxylic acids having up to about 10 C atoms, as well as their functional derivatives, e.g. anhydrides or acid chlorides.

Saturated monocarboxylic acids, e.g. acetic acid, chloroacetic acid, propionic acid and stearic acid, or their functional derivatives, e.g. anhydrides, are also suitable, though they are not always as good as dialdehydes or dicarboxylic acids.

The reaction of the metal phthalocyanines having 0 to 4 halogen atoms with 1 to 10 moles of a dialdehyde, dicarboxylic acid or saturated monocarboxylic acid or one of their acid derivatives can be conducted either in mixture with the compound (A) to be made stable to separation, or before mixing with this compound. In the latter case the component (A) is best mixed with the reaction product (B) at the temperature at which the reaction giving product (B) is carried out, and if necessary in a solvent, e.g. concentrated sulfuric acid which may contain oleum if desired, phosphoric acid, or an organic or aqueous-organic medium, e.g. in organic bases such as aniline, nitrobenzene, mono- or dichlorinated benzene or chloronaphthalene. Mixing can be done in a mixing machine in which at the same time the pigment particles are disaggregated, e.g. a ball or roll mill, grinding machine, high-pressure homogenizer or kneader mixer. When the metal phthalocyanines containing 0 to 4 halogen atoms are reacted with dialdehydes or carboxylic acids in mixture with the compounds (A) to be made stable to separation, the non-separating pigments are already obtained in the finely divided state on discharging the sulfuric acid reaction solution into water.

A similarly finely divided pigment is obtained when the mixture is reacted in aqueous-organic medium with several hours' heating according to the process disclosed in Belgian Patent 593,778 or U.S. Patents 2,833,782 or 2,833,783.

Often it is preferable to use an already finely divided pigment (A) which, for example, can be precipitated from solution in sulfuric acid or phosphoric acid or treated for several hours with heating with organic bases, e.g. aniline (cf. Belgian Patent 593,778) or dichlorobenzene (cf. U.S. Patents 2,833,782 and 2,833,783).

In the examples the parts and percentages are by weight and the temperatures in degrees centigrade.

*Example 1*

20 parts of crude copper phthalocyanine, obtained by condensation of a mixture of phthalic anhydride and urea in the known way, are dissolved at 85° in 180 parts of sulfuric acid monohydrate and 180 parts of 26% oleum. After the addition of 10 parts of glyoxal the solution is heated at 85° for 5 hours with constant stirring. On cooling, it is poured into 2000 parts of ice, and the pigment filtered off with suction and washed until neutral.

10 parts of the 10% filter residue thus obtained are mixed with 60 parts of a 30% filter residue of a chlorinated copper phthalocyanine of 48.6% chlorine content, produced by chlorination of copper phthalocyanine in a melt of aluminum chloride and sodium chloride. After the addition of 44 parts of aniline the mass is heated at 80° for 10 hours with stirring. Then 40 parts of water and 65 parts of 30% hydrochloric acid are added and stirring continued for 1 hour at 80°. Finally the pigment thus formed is filtered off with suction, washed with hot water until neutral, dried and pulverized. It colors nitrocellulose lacquers green and does not separate from the medium.

Using the same procedure, cobalt or vanadium phthalocyanine can be reacted with glyoxal, or copper phthalocyanine with glutardialdehyde, and the reaction products worked up in the above-described way to give further pigments stable to separation.

*Example 2*

20 parts of crude nickel tetrachlorophthalocyanine, obtained in the known way by condensation of a mixture of phthalic anhydride and tetrachlorophthalic anhydride with urea, are dissolved in 290 parts of sulfuric acid monohydrate and 70 parts of 20% oleum at 85°. 7 parts of glyoxal are added, the solution heated for 5 hours at 85° with stirring and allowed to cool. It is then run onto 2000 parts of ice, the precipitate filtered off with suction and washed until neutral.

The product so formed is treated further as described in Example 1. The pigment is completely stable to separation in nitrocellulose lacquers.

20 parts of zinc phthalocyanine or monochlorocopper phthalocyanine can be reacted with glyoxal at 95° in the manner described in the foregoing and the reaction products used for the production of non-separating pigments.

*Example 3*

20 parts of copper phthalocyanine are dissolved in 300 parts of sulfuric acid monohydrate and 60 parts of 20% oleum at 90°. After the addition of 10 parts of maleic acid the mass is heated at 90° for 5 hours. The further treatment of the reaction product and the production of its mixture with hexadecachlorocopper phthalocyanine are carried out in accordance with the procedure of Example 1. A pigment stable to separation is obtained.

In the same way copper phthalocyanine can be reacted with acetic acid or propionic acid.

*Example 4*

10 parts of copper phthalocyanine and 90 parts of crude hexadecachlorocopper phthalocyanine, produced according to the particulars given in Swiss Patent 238,337, are dissolved in 900 parts of sulfuric acid monohydrate and 900 parts of 25% oleum at 85°. 7 parts of glyoxal are added, the mass heated for 6 hours at 85° with stirring, then allowed to cool and poured onto 5000 parts of ice. The precipitate is filtered off with suction and washed until neutral. On drying and pulverizing, a green pigment is obtained which is very much stabler to separation in nitrocellulose lacquers than hexadecachlorocopper phthalocyanine.

*Example 5*

10 parts of the copper phthalocyanine reacted with glyoxal according to the procedure of Example 1 are dissolved in dry powder form with 90 parts of crude pentadecachlorocopper phthalocyanine in 500 parts of sulfuric acid monohydrate and 54 parts of 25% oleum at 70°. The mass is allowed to cool and then run into 2500 parts of ice-water. The precipitate is filtered off with suction, washed until neutral and dried. The stability to separation of the pigment thus obtained is substantially improved.

In order to obtain green pigments (A) stable to separation, about 2 to 10% or preferably 5 to 10% by weight of (B), calculated on (A), can be used as a general rule. Larger amounts can be employed but in this case the shade of (A) shifts toward blue.

Having thus disclosed the invention what we claim is:

1. Process for the production of modified phthalocyanine pigments which comprises reacting by heating to a temperature between about 50° and 150° C. 1 mol of a phthalocyanine selected from the group consisting of copper, nickel and zinc phthalocyanines and the corresponding monochlorinated compounds with 1 to 10 moles of glyoxal.

2. Process for the production of modified phthalocyanine pigments which comprises reacting by heating to a temperature between about 50° and 150° C. 1 mol of a phthalocyanine selected from the group consisting of copper, nickel and zinc phthalocyanines and the corresponding monochlorinated compounds with 1 to 10 moles of glutardialdehyde.

3. Process for the production of modified phthalocyanine pigments which comprises reacting by heating to a temperature between about 50° and 150° C. 1 mol of a phthalocyanine selected from the group consisting of copper, nickel and zinc phthalocyanines and the corresponding monochlorinated compounds with 1 to 10 moles of maleic acid.

References Cited in the file of this patent
UNITED STATES PATENTS

| | | |
|---|---|---|
| 2,964,531 | Kirby et al. | Dec. 13, 1960 |
| 3,002,845 | Hoelzle | Oct. 3, 1961 |

FOREIGN PATENTS

| | | |
|---|---|---|
| 679,808 | Great Britain | Sept. 24, 1952 |

OTHER REFERENCES

Ephraim: Inorganic Chemistry, Interscience, New York (1954), 6th Eng. Ed., page 591.

Royals: Advanced Organic Chemistry, Prentice-Hall, Englewood Cliffs, New Jersey (1954), page 467.